United States Patent
Hill et al.

(10) Patent No.: US 9,285,958 B1
(45) Date of Patent: Mar. 15, 2016

(54) BROWSER INTERFACE FOR ACCESSING PREDICTIVE CONTENT

(71) Applicant: Amazon Technologies, Inc., Reno, NV (US)

(72) Inventors: Peter Frank Hill, Seattle, WA (US); Charley Ames, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 13/681,166

(22) Filed: Nov. 19, 2012

(51) Int. Cl.
*G06F 3/00* (2006.01)
*G06F 3/0483* (2013.01)
*G06F 17/30* (2006.01)

(52) U.S. Cl.
CPC .......... *G06F 3/0483* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 5,815,153 A * | 9/1998 | Isensee et al. | 715/764 |
| 6,292,185 B1 * | 9/2001 | Ko et al. | 715/763 |
| 6,691,163 B1 | 2/2004 | Tufts | |
| 8,260,656 B1 | 9/2012 | Harbick et al. | |
| 2001/0029527 A1 * | 10/2001 | Goshen | 709/218 |
| 2002/0198882 A1 | 12/2002 | Linden et al. | |
| 2005/0132296 A1 * | 6/2005 | Milic-Frayling et al. | 715/745 |
| 2006/0085766 A1 * | 4/2006 | Dominowska et al. | 715/854 |
| 2007/0050351 A1 * | 3/2007 | Kasperski et al. | 707/4 |
| 2009/0172021 A1 | 7/2009 | Kane et al. | |

OTHER PUBLICATIONS

Co-owned U.S. Appl. No. 13/211,188, filed Aug. 16, 2011 (copies of specification, drawings and filing receipt submitted).
Co-owned U.S. Appl. No. 13/430,514, filed Mar. 26, 2012 (copies of specification, drawings and filing receipt submitted).

* cited by examiner

*Primary Examiner* — Stella E Higgs
(74) *Attorney, Agent, or Firm* — Knobbe, Martens, Olson & Bear LLP (57) ABSTRACT

A browser interface is described for displaying predictive content that is predicted to be interesting to a user. In one embodiment, a forward button in a browser may become a predictive forward button when the user is at the end of a history stack. By selecting the predictive forward button, the user may access predictive content, such as content related to one or more pages viewed during the current browsing session. In some embodiments, the user can sequentially select the predictive forward button any number of times to iteratively explore new content, such as content that is related to other content viewed during the current session.

18 Claims, 6 Drawing Sheets

FIG. 4

BROWSER INTERFACE FOR ACCESSING PREDICTIVE CONTENT

BACKGROUND

Many browser applications maintain a history of the Uniform Resource Locators (URLs) accessed by a user during the current browsing session or over a longer period of time. This history is sometimes referred to as a history stack. Browsers also commonly include navigation controls, such as a "back" button or arrow and a "forward" button or arrow, for enabling the user to navigate backward and forward within this history. When the browser is displaying the last page in this history (i.e., is at the "end" or "top" of the history stack), the forward button is ordinarily disabled.

Some browsers also include functionality for suggesting web sites to users. The sites that are suggested to a user are typically based on the browsing history of the user, and possibly the browsing histories of other users. To implement this feature, the browser may report some or all of the user's browsing history to a server, and may retrieve associated site recommendations from the server.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

I. Overview

A browser user interface is disclosed that enables users to efficiently and intuitively access recommended or predictive content, such as content that is predicted to be of interest to a user based on the user's past browsing behaviors. In one embodiment, the browser interface includes a forward navigation control (e.g., button) that becomes, or is transformed into, a predictive forward navigation control when the browser is at the end of the history stack. If the user selects the predictive forward navigation control, the browser displays recommended content, such as a recommended page, that is not included or represented in this history stack. Thus, for example, upon reaching the end of the history stack, the user can effectively continue to "browse forward" to discover additional content. This additional content may be selected using recommendation algorithms that are known in the art, and may be selected based partly or wholly on the contents of the history stack.

In some embodiments, the browser changes the appearance of the forward button (preferably without changing its location relative to other browser UI elements) to indicate or reflect that the button provides access to predictive content. This may be accomplished by, for example, changing the color, icon, text, and/or other visual attributes of the forward button when the end of the history stack is reached. The forward button's appearance may subsequently revert back if the user uses the back button to navigate back within the history stack. In other embodiments the appearance of the forward button may stay the same regardless of its change in function. In some embodiments, a predictive forward button may be displayed in addition to a standard forward button when a user is not at the end of the user's history stack, such that the user can selectively navigate forward either to previously accessed content or to new content.

In some implementations, the forward button may become a predictive forward navigation control only when certain additional conditions are met, such as one or more of the following: (1) more than N pages or URLs exists in the history stack, where N is an integer such as 1, 2, 3 or 4, such that the predictive content can be based on multiple recently-accessed URLs, (2) the user has navigated backward in the history stack and has then used the standard forward button to return to the end of the history stack, (3) predictive content is available from a recommendation system that supplies such content. In other embodiments, the predictive forward navigation control may serve as an "infinite forward button" that can be selected an unlimited number of times to continue to explore new but related content.

For purposes of this description, a content object (e.g., page) that is retrievable from a URL is said to be "in" or "included in" the history stack if the content object itself, and/or a reference to the content object (e.g., is URL), is/are stored in the history stack. In some embodiments, the history stack only maintains a history of the content objects accessed since the browser was last launched. In other embodiments, the history stack may also include content objects from prior browsing sessions and/or instances of the browser.

The predictive content that is accessible via the predictive forward navigation control may be generated by a network-accessible recommendation system based on monitored browsing behaviors of users, and/or based on an analysis of content. This recommendation system may be part of an intermediary system that sits logically between browsers and web sites, in which case the intermediary system may also serve as a proxy server for the browsers. Alternatively, the recommendation system may be implemented on a non-intermediary system, such as on a separate server with which the browsers are designed or configured to communicate. In either case, the browsers/devices of users may report browsing behaviors of users to, and retrieve predictive content (or links to such content) from, the recommendation system. In other embodiments, the recommendations may be generated partly or wholly by the browser.

The recommendation system may use any of a variety of algorithms to select pages, sites, and/or other content to recommend to users. For example, the recommendation system may generate the recommendations using the methods and components described in one or more of the following references, the disclosures of which are hereby incorporated by reference: U.S. Patent Pubs. 2002/0198882 and 2009/0172021; U.S. Pat. No. 6,691,163; and U.S. application Ser. No. 13/430,514, filed Mar. 26, 2012. Numerous algorithms are available for selecting URLs and content objects to recommend, and the user interface described herein is not limited to any particular algorithm or class of algorithms.

As one example, the predictive content presented to a user may be based partly or wholly on the URLs accessed by other users who have viewed some or all of the URLs in the history stack. For example, suppose that a user accesses pages or sites A, B and C, and then uses the predictive forward navigation control to request predictive content. The browser may respond by displaying a page (or a link thereto) that is commonly accessed by users who have accessed these same three pages or sites. To support such functionality, the recommendation system may store and analyze the browse histories of many users, and may maintain a mapping that associates particular URLs (and/or sets of multiple URLs) with related URLs. If the user selects the predictive forward navigation control multiple times sequentially, the recommendations may be updated or regenerated recursively to reflect the new/predictive content already viewed by the user. Although the predictive/recommended content is typically personalized for the user (e.g., based on the user's browsing history), this need not be the case; for example, the recommendation system could recommend particular content objects based solely on their popularity levels.

One aspect of the invention is thus a browser application comprising: a history stack component that maintains a sequential history of content objects (e.g., pages) accessed by a user; and a user interface component that provides a browser user interface. The browser user interface includes a back button that enables the user to navigate backward in the sequential history to go back to a previously accessed content object, and includes a forward button that enables the user to navigate forward in the sequential history. The user interface component also includes executable code that is responsive to the user reaching a last content object in the sequential history by modifying a function of the forward button such that selection of the forward button while viewing the last content object causes the browser application to display or suggest at least one recommended content object that is not included in the sequential history. The user interface component may enable the user to sequentially select the forward button an unlimited number of times to repetitively access new content that is related to other content viewed during the current browsing session. The browser application may be stored on a non-transitory computer-readable medium.

The invention also comprises a browser application comprising executable code that directs a user computing device to implement a process that comprises: maintaining a sequential history of content objects accessed by a user, the sequential history comprising identifiers of a plurality of content objects; providing a user interface that includes a back button and a forward button that enable the user to navigate backward and forward, respectively, in the sequential history; and in response to detecting that the user, via the forward button, has reached an end of the sequential history, exposing an option on said user interface for the user to navigate forward to a recommended content object that is not included in the sequential history. The option to navigate forward may be provided by transforming a function of the forward button, in which case the appearance of the forward button may also be modified.

Particular embodiments of the invention will now be described with reference to the drawings. In these embodiments, the browser assists web site users in viewing content over a network environment. As will be apparent, the invention may also be implemented in a variety of other contexts. For example, the invention may be used to assist users in viewing other types of items, including but not limited to journal articles, news articles, files, blogs, television shows, movies, travel sites, auctions, events, travel destinations, tickets, and businesses. In addition, the invention may be employed in other types of interactive systems, including but not limited to mobile applications and interactive television systems.

II. Example Screen Displays

Figure 1A:
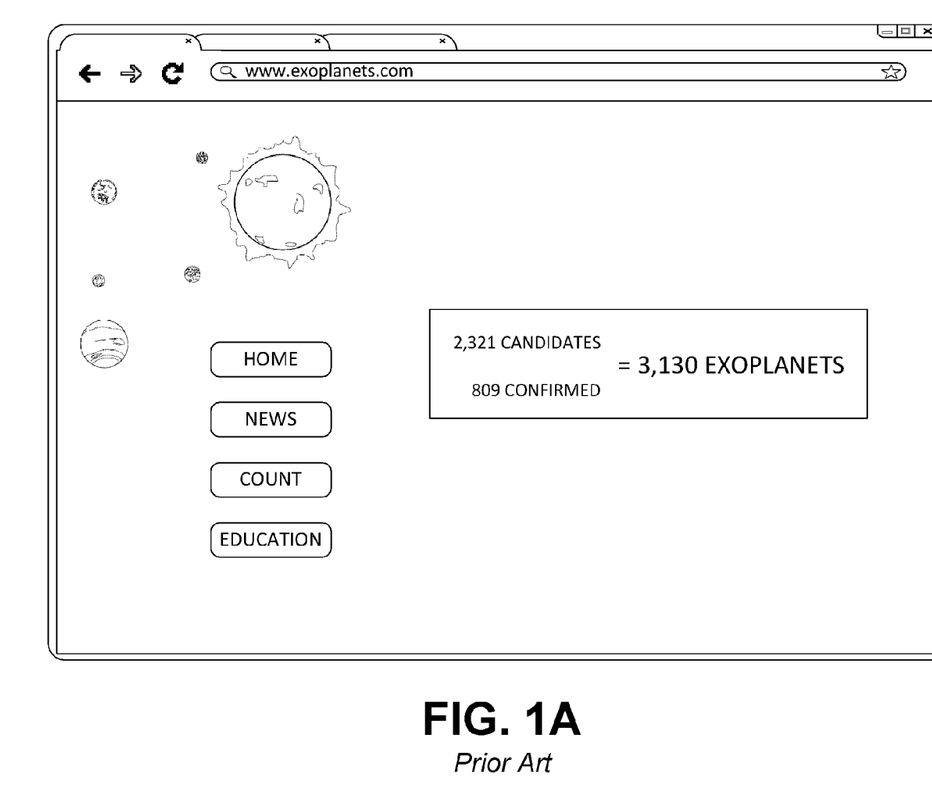
FIG. 1A illustrates a prior art browser with the forward button disabled.

FIG. 1A shows an example browser of the prior art. The forward button (namely the button with the arrow pointing to the right) is disabled (and grayed out) when a user is at the top of the history stack.

In one embodiment of a browser according to the present invention, the user interface remains unchanged, except that the forward button is not disabled and grayed out in at least some scenarios in which the top of the history stack is reached. (As explained above, the browser may also alter the appearance of the forward button to reveal or signal its change in function.) Thus, the user in these scenarios can select the forward button (which serves as a predictive forward button) to cause the browser to load and display recommended content. In some embodiments, the browser may respond to the user's selection of the predictive forward button by loading and displaying a recommended page, such as a page that is related to one or more of the pages in the history stack.

In other embodiments, the browser may respond to the user's selection of the predictive forward button by displaying a special "recommendations" page that includes links to, and possibly summaries of, multiple recommended pages, sites, or other content. Where such an intermediate recommendations page is displayed, each recommendation may be displayed together with an indication of a basis for the recommendation. For example, a recommendation of a particular site or page may be displayed with an indication that it is being recommended because it is frequently accessed by those who visit a particular site or page in the browser's history stack, or because it contains content similar to the content of one or more pages in the history stack.

To improve performance, the browser may prefetch, or an intermediary server may pre-deliver to the browser, the pages that will be displayed upon selection of the predictive forward button. In such embodiments, the browser may cache the prefetched or pre-delivered pages transparently to the user.

Whenever the user browses forward to a recommended page, the recommended page (and/or its URL) is added at the top of the history stack. This recommended page may then become a recommendation source or "seed" for obtaining additional recommendations. This process can be repeated any number of times, such that the forward button acts essentially as an infinite predictive forward button for endlessly exploring new content. In some embodiments, the recommendation system may only recommend URLs/content objects that are not included in the browser's history stack. In other embodiments, the recommendation system may be capable of recommending a content object included in the history stack if that content object has changed in a meaningful way since it was last accessed by the user.

Figure 1B:
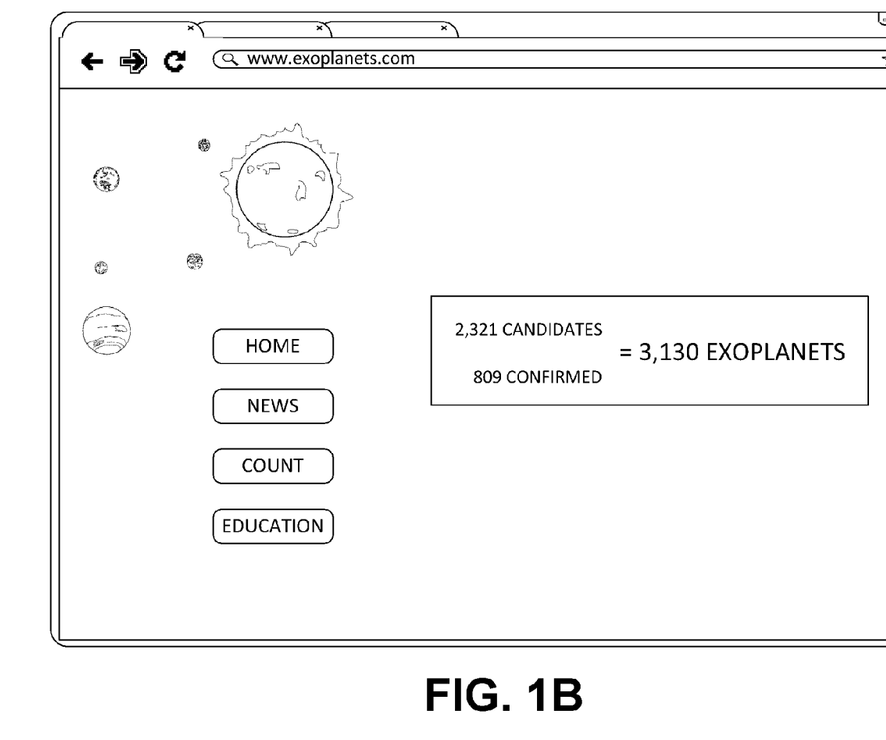
FIG. 1B illustrates one embodiment of a browser with a predictive forward button.

FIG. 1B shows an example browser interface in which the forward button is displayed in a slightly modified form (namely with a border surrounding the arrow) when the browser is at the top of the history stack. This modification signals to the user that the function of the forward button has changed. In some embodiments, a more explicit indication of the change in function may be displayed. For example, a different type of arrow may be displayed, or text may be added to the button.

Figure 1C:
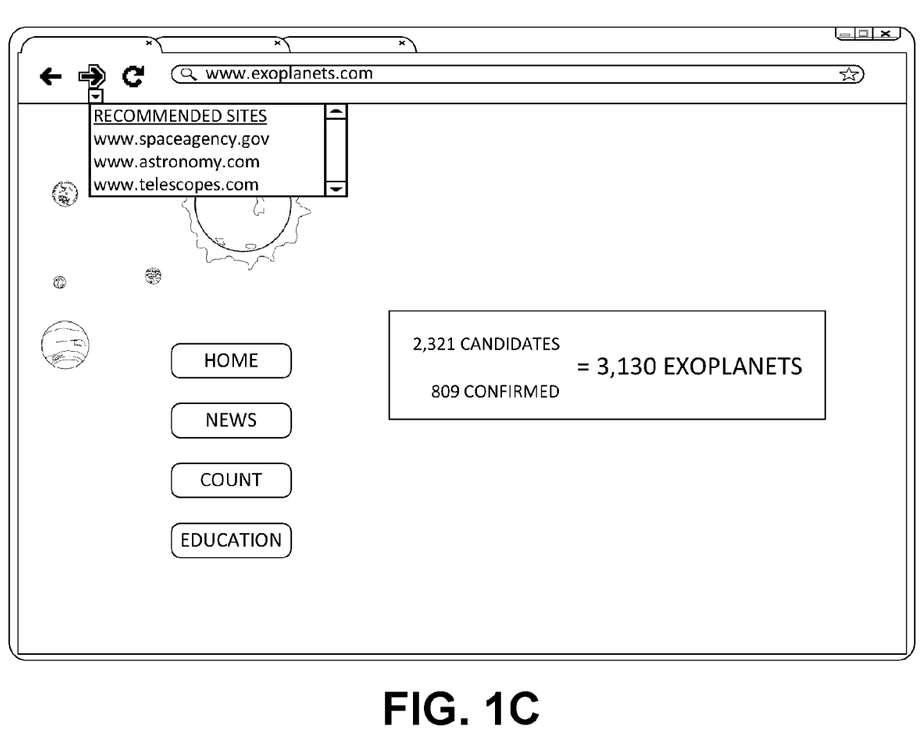
FIG. 1C illustrates another embodiment of a browser with a predictive forward button.

FIG. 1C shows another embodiment in which the predictive forward button provides access to a drop-down list of the recommended content objects. The drop-down list may, for example, be displayed when the user presses and holds the forward button (in the case of a touch screen), or when the user hovers the mouse cursor over the forward button (in the case of a non-touch screen). In this particular example, the recommended content objects are recommended sites. Lower level recommendations may also be provided, such as recommendations of specific lower-level pages of specific sites.

While viewing the drop-down list show in FIG. 1C, the user can select one of the listed links to cause the browser to load and display the corresponding content object.

Figure 2:
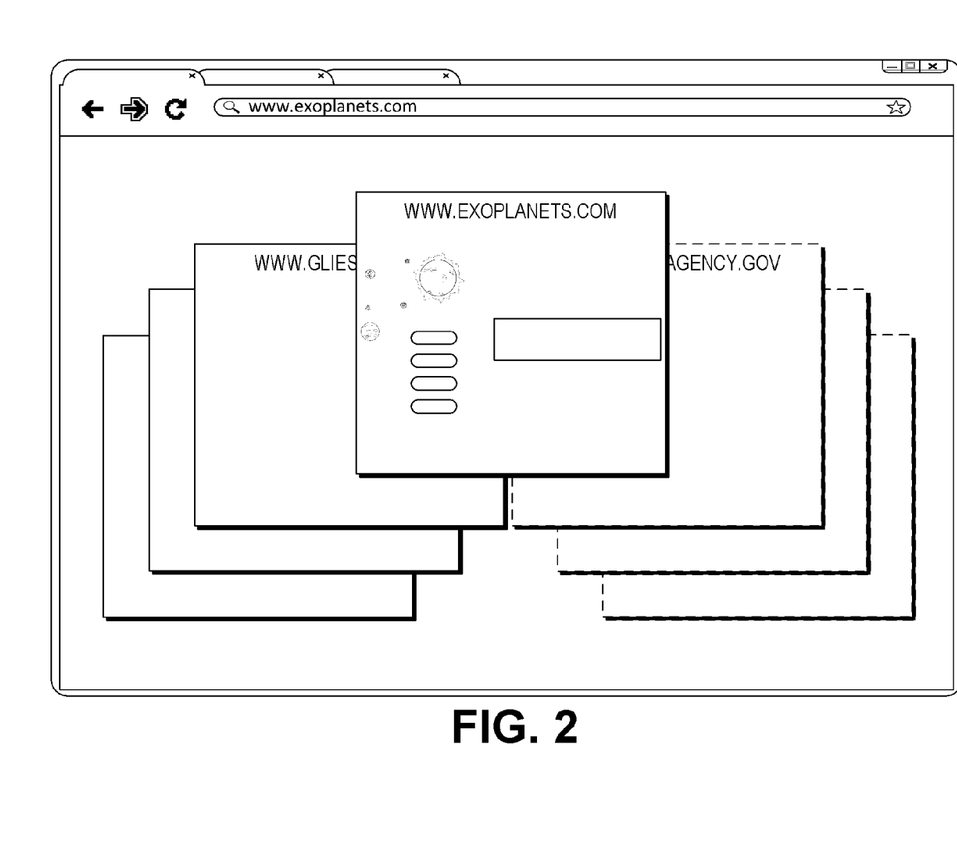
FIG. 2 illustrates one embodiment of a content display interface with a scrollable timeline of browsing history and predictive content.

FIG. 2 illustrates a browser interface according to another embodiment. In this embodiment, when the user selects the (predictive) forward button, the browser generates and displays an interactive "carousel" interface that includes screenshots of multiple recommended pages. The carousel may also include screenshots of some or all of the content objects included in the history stack. Via this interface, the user can scroll forward and backward (e.g., via left and right swipe gestures) to view previews of particular pages. The user can also tap on, or otherwise select, one of the screenshots to cause the browser to load and display the corresponding page.

III. System Components (FIG. 3)

Figure 3:
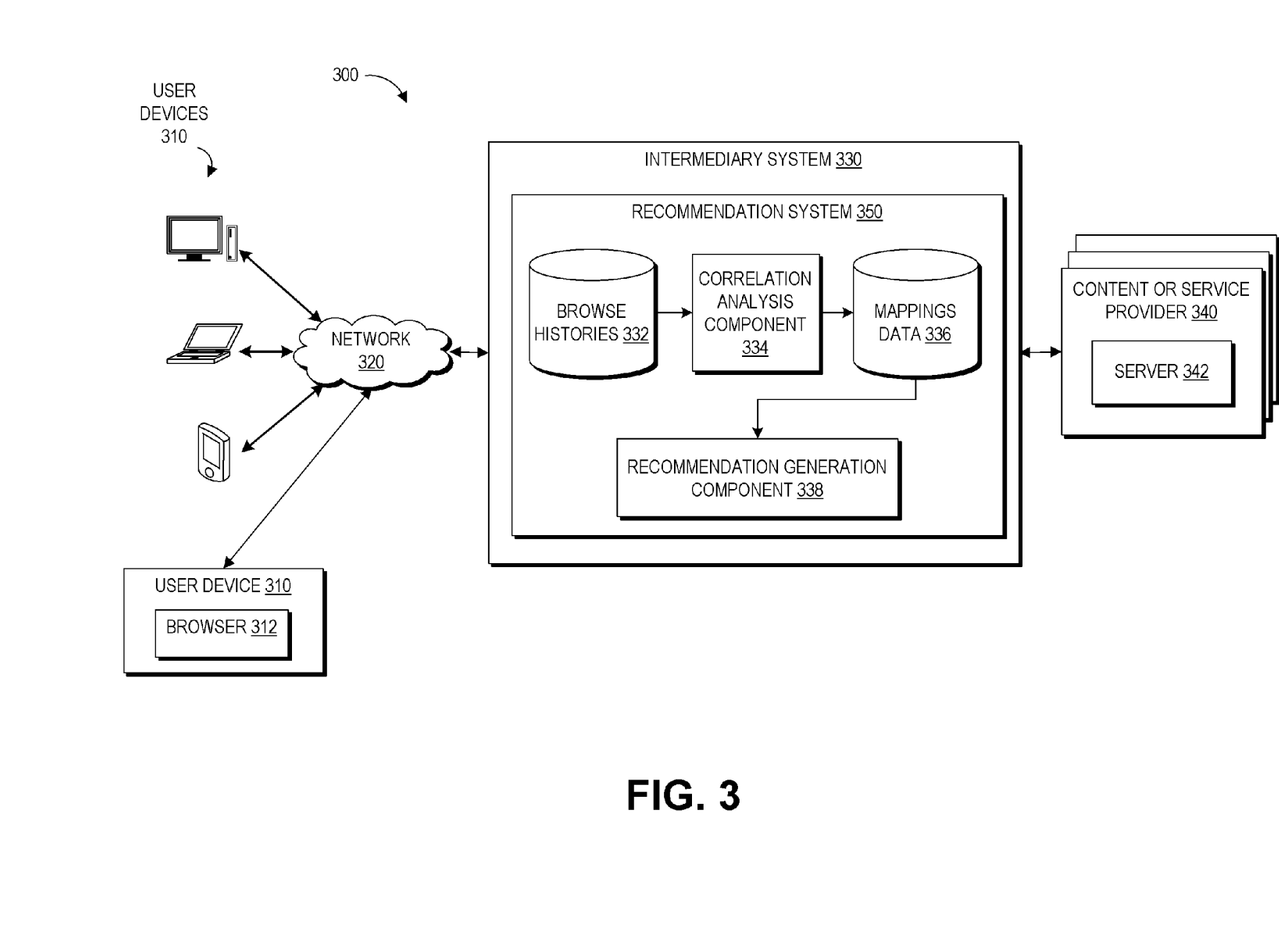
FIG. 3 illustrates a block diagram of a network-based system according to one embodiment.

FIG. 3 illustrates one example of how a predictive forward feature as described above may be implemented in the context of a network environment 300 in which an intermediary system 330 provides access to content sites 340, such as web sites. The user devices 310 that access the content sites 340 can include various types of computing devices, such as desktop computers, laptop computers, tablets, personal digital assistants (PDAs), mobile phones (including smartphones), electronic book readers, other wireless devices, set-top or other television boxes, media players, game platforms and kiosks, among others. The user devices 310 access the content sites 340 over a network 320, which can include a local area network or a wide area network, such as the Internet. Each content site 340 may include a server 342 that serves content, such as web pages, in response to URL requests.

The intermediary system 330 may serve in part as a proxy server for the user devices 110, and/or may serve as a content delivery network. In some embodiments, the intermediary system 330 may also pre-render portions of the requested pages to facilitate display on certain types of devices, such as tablets and smartphones. The browsers 312 that run on the user devices 310 may be designed or configured to send all content requests to the intermediary system 330.

To support the display of recommendations in the illustrated embodiment, the intermediary system 330 includes a repository of user browse histories 332, a correlation analysis component 334, a mappings database 336, and a recommendation generation component 338. These components 332-338 make up a recommendation system 350. The repository of browse histories 332 may store user-specific or session-specific sequences of URLs accessed by users, and may be maintained based on URL requests received from the user devices 310. The correlation analysis component 334 periodically analyzes the browse histories on an aggregated basis for purposes of detecting and quantifying behavior-based relationships between particular content objects (pages, sites, etc.).

The mappings database 336 stores relationship data that maps content objects to related content objects. The mappings may, for example, be in the form of URL-to-URL mappings, or in the form of association rules that map groups of URLs to related URLs. The mappings may additionally or alternatively be based on content-based similarities between content objects.

The recommendation generation component 338 is responsible for selecting content objects to recommend to a user based on a combination of (1) some or all of the user's browse history (e.g., the last N URLs accessed, or all URLs included in the history stack), and (2) the relationship data stored in the mappings database 336. For example, when (or before) a user selects the predictive forward button, the browser 312 may request, and the recommendation generation component 338 may return, a list of URLs that are the most closely related to the URL or URLs most recently accessed by the user. Various algorithms may be used to select particular URLs/content objects to recommend, including those described in U. S. Patent Pub. 2002/0198882, referenced above.

Where no URL-to-URL mappings exist for the content object(s) in the history stack, an alternate recommendations algorithm may be used. For example, if a single page is in the history stack and no URL-to-URL mapping exists for this page, the recommendation generation component 338 may perform a keyword analysis of the page, assign the page to a topic based on the keyword analysis, and then recommend one or more popular pages associated with the topic.

For purposes of generating the recommendations, the recommendation generation component 338 may give more weight to the URL or URLs most recently accessed by the user, so that the recommendations are based to a greater extent on the user's most recent browse activity. Further, the recommendation generation component 338 may, where possible, generate the recommendations based solely on the URL at the end of the history stack, without regard to any other URLs/content objects in the history stack.

The recommendation generation component 338 may, in some embodiments, also take into consideration whether particular (candidate) content objects are well suited for display on the particular type of user device 310 that is requesting recommendations. For example, if the user device is a smartphone, candidate pages that are not well suited for display on smartphones (due to their small screen sizes) may be excluded from the recommendations. The recommendation generation component 338 may also refrain from recommending any content objects (or substantial duplicates of content objects) that are already in the browser's history stack, such that each recommendation is of a content object that has not yet been viewed during the current browsing session. The recommendation system 350 may also take into consideration various other factors in selecting content objects to recommend, including, for example: the geo-location of the device 310, the time of day, the speed at which the device 310 is moving, the applications installed on the device 310, and/or which applications are currently running on the device 310.

The intermediary system 330 may be implemented by or on a computing system that comprises one or more physical computing devices (physical servers, storage arrays, routers, etc.), each of which may include a processor and memory. The computing system may, in some cases, include computing devices that are distributed geographically, in which case some of the disclosed server-side tasks may be performed remotely from others. The code modules may be persistently stored on any type or types of non-transitory computer storage devices or media (magnetic disks, solid state memories, optical drives, etc.). Some or all of the disclosed processes may alternatively be embodied partly or wholly in specialized computer hardware, such as in custom designed ASICs or FPGAs. The various components of the network environment 300 can also be implemented in one or more virtual machines or cloud resources, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware.

As mentioned above, the functionality described herein can alternatively be implemented without the use of an intermediary system 330. In such embodiments, the recommendation system 350 may alternatively be implemented on a separate network-accessible server system that does not act as an intermediary between the browsers 312 and content sites 340. The browsers 312 may report the browsing behaviors of users to such a server system on a real time or non-real time basis. Further, as mentioned above, the recommendations could alternatively be generated by the browsers.

The browser 312 may include executable code stored on any type of non-transitory storage medium, including code for implementing the client-side functions described herein.

IV. Browser Operation (FIG. 4)

Figure 4:
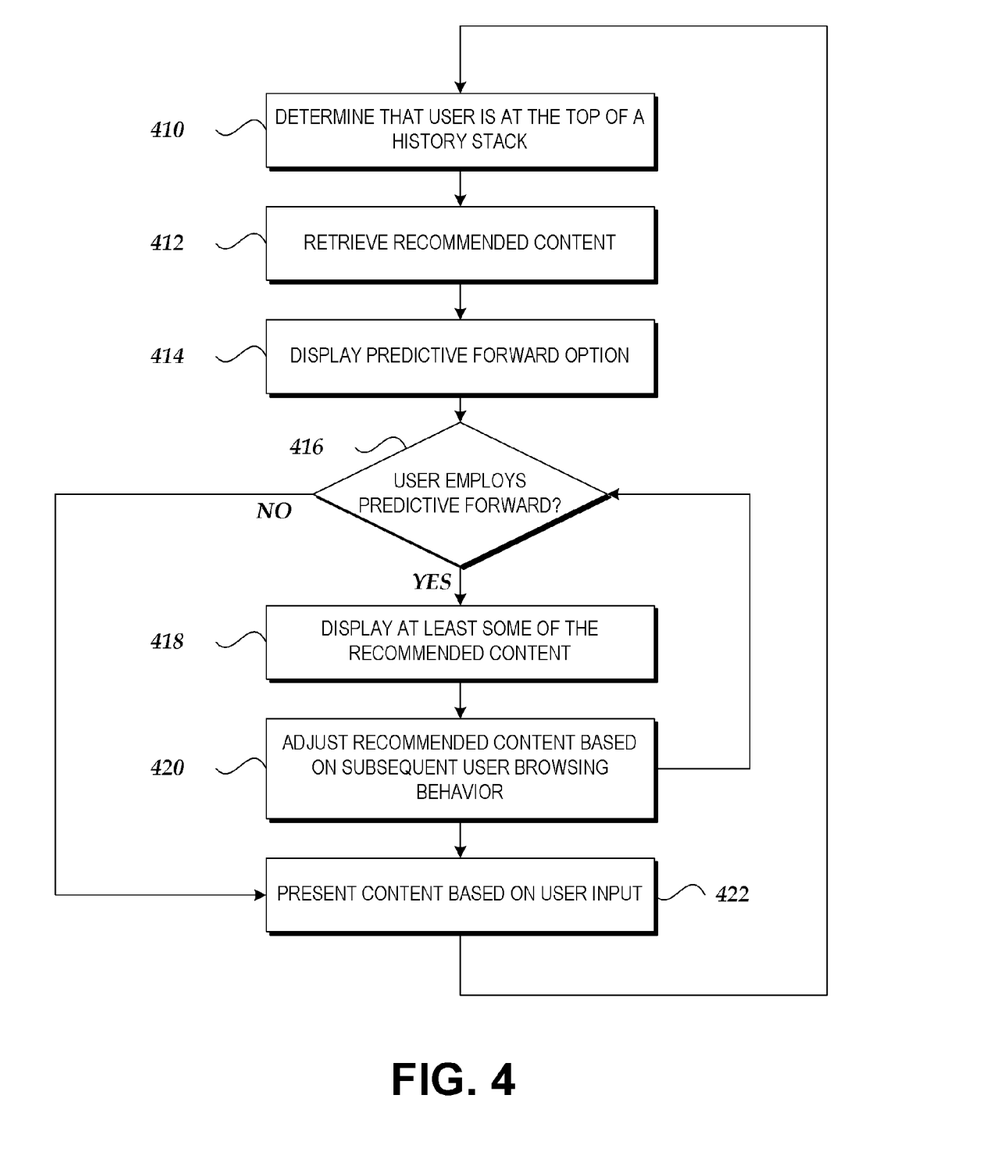
FIG. 4 illustrates a process implemented by the browser of FIG. 3 to retrieve and display predictive content.

FIG. 4 illustrates one example of a process that may be implemented within the browser 312 to support the functions described above. At block 410, the process determines that the user is at the top (end) of the history stack. At block 412, the browser responds to this determination by requesting and retrieving recommended content from the recommendation system 350. The recommended content may be delivered to the browser as a URL or list of URLs, and/or as the actual content object(s) referenced by such URLs. The task of retrieving the recommended content from the recommendation system 350 may alternatively be performed when the user selects the predictive forward button.

At block 414, the process displays the predictive forward button or option. If, at block 416, the user selects this button or option, the browser displays the recommended content (block 418) using one of the methods described above, and updates the history stack accordingly. At block 420, the browser may also retrieve additional recommended content from the recommendation system 350 based on the updated history stack. As depicted by block 422, the browser either displays the recommended content (if the predictive forward button was selected), or displays the content object that was at the top of the history stack in block 410 (if the predictive forward button is not selected).

As mentioned above, in some embodiments the browser may display both the standard forward button and the predictive forward button when the browser is not at the end of the history stack. This enables the user to select between sequencing forward in the history stack versus branching off to new (but related) content. If the predictive forward button is selected in such scenarios, the recommendations may be based primarily or exclusively on the content object currently displayed, rather than the content object at the end of the history stack; thus, for example, the user can use the back button to go back to a page, and then use that page as a basis for requesting recommended content.

V. Conclusion

The browser-side features described above, including the tasks shown in FIG. 4, may alternatively be embodied in a browser toolbar or plug-in that modifies the behavior of the browser's standard forward button or that creates a new forward button.

All of the processes described herein may be embodied in, and fully automated via, code modules (sequences of instructions) executed by a computing system that comprises one or more computing devices. Each such computing device typically includes a memory and at least one processor. The computing system may, in some cases, include computing devices that are distributed geographically, in which case some of the disclosed tasks may be performed remotely from others. The code modules may be persistently stored on any type or types of non-transitory computer storage devices or media. Some or all of the disclosed processes may alternatively be embodied partly or wholly in specialized computer hardware, such as in custom designed ASICs or FPGAs.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims, which are intended to be interpreted without reference to any explicit or implicit definitions that may be set forth in the incorporated-by-reference materials.

What is claimed is:

1. A non-transitory computer readable medium having stored thereon a browser application, said browser application comprising:
   a history stack component that maintains a sequential history of content objects accessed by a user; and
   a user interface component that provides a browser user interface, said browser user interface including a back button that enables the user to navigate backward in the sequential history to go back to a previously accessed content object, said user interface additionally including a forward button that enables the user to navigate forward in the sequential history;
   wherein the user interface component comprises executable code that is responsive to the user navigating forward via the forward button in the sequential history to a last content object of a plurality of content objects in the sequential history by modifying a function of the forward button such that selection of the forward button while viewing the last content object causes the browser application to display or suggest at least one recommended content object that is not included in the sequential history, whereby the forward button is transformed into a predictive forward navigation control when the user reaches the last content object in the sequential history.

2. The computer readable medium of claim 1, wherein the recommended content object is selected based at least partly on the sequential history of content objects.

3. The computer readable medium of claim 1, wherein modifying the function of the forward button comprises modifying an appearance of the forward button to reveal a change in function.

4. The computer readable medium of claim 1, in wherein the user interface component enables the user to sequentially select the forward button to repetitively access new content that is related to other content viewed during a current browsing session.

5. The computer readable medium of claim 1, in combination with a recommendation system that communicates over a network with the browser application and notifies the browser application of the recommended content object.

6. The computer readable medium of claim 1, wherein the content objects are web pages.

7. A non-transitory computer readable medium having stored thereon a browser application, said browser application comprising executable code that directs a user computing device to implement a process that comprises:
  maintaining a sequential history of content objects accessed by a user, said sequential history comprising identifiers of a plurality of content objects;
  providing a user interface that includes a back button and a forward button that enable the user to navigate backward and forward, respectively, among the content objects in the sequential history; and
  in response to detecting that the user, via the forward button, has reached a last content object of the sequential history, exposing an option on said user interface for the user to navigate forward to a recommended content object that is not included in the sequential history, the option to navigate forward to a recommended content object provided by transforming a function of the forward button in response to the last content object of the sequential history being reached.

8. The computer readable medium of claim 7, wherein exposing said option comprises transforming an appearance of said forward button.

9. The computer readable medium of claim 7, wherein the recommended content object is selected based at least partly on the sequential history of content objects.

10. The computer readable medium of claim 7, wherein the option to navigate forward to a recommended content object is sequentially selectable to repetitively explore additional content.

11. A computer-implemented method of presenting predictive content to users, the method comprising:
  receiving input from a user via a browser on a user device, wherein the user input is a selection of a forward button of the browser and causes the browser to display a network-accessible content object included in a history stack of the browser, said content object being one of a plurality of content objects included in the history stack;
  determining that the network-accessible content object is at the end of the history stack;
  generating the predictive content; and
  providing, for presentation within the browser in response to the determination that the content object is at the end of the history stack, a predictive forward button that is selectable by the user to access at least a portion of the predictive content, the predictive forward button provided at least partly by transforming a function of the forward button of the browser in response to the determination that the content object is at the end of the history stack.

12. The computer-implemented method of claim 11, wherein the predictive content is generated based at least in part on browsing behavior of the user.

13. The computer-implemented method of claim 11, wherein the predictive forward button provides access to a drop-down listing of a plurality of recommended content objects.

14. The computer-implemented method of claim 11, wherein the network-accessible content object is a web page.

15. The computer-implemented method of claim 11, wherein the predictive forward button is sequentially selectable to repetitively explore additional content.

16. The computer-implemented method of claim 11, wherein the predictive forward button also serves as a standard forward button for sequencing forward within the history stack when the user is not currently browsing a content object at the end of the history stack.

17. A computing device comprising:
  a processor coupled to a memory and a display; and
  a browser application stored in the memory, said browser application comprising executable code that directs the computing device to at least:
    maintain a sequential history of content objects accessed by a user via the browser application, said sequential history comprising identifiers of a plurality of content objects;
    provide a user interface that includes a back control and a forward control that enable the user to navigate backward and forward, respectively, in the sequential history;
    detect that the user, via the forward control, has reached a last content object of the plurality of content objects in the sequential history; and
    in response to detecting that the user has reached the last content object, expose an option on the user interface for the user to navigate forward to recommended content, the option to navigate forward to recommended content provided at least partly by transforming a function of the forward control in response to the last content object being reached.

18. The computing device of claim 17, wherein the browser application exposes said option in part by modifying an appearance of the forward control.

* * * * *